March 10, 1953 — D. P. ECKMAN — 2,630,824
CONTROL APPARATUS

Filed Nov. 15, 1947 — 2 SHEETS—SHEET 1

- $a$ = BULB TEMPERATURE
- $b$ = CHAMBER M PRESSURE
- $c$ = CHAMBER N PRESSURE
- $d$ = DISPLACEMENT OF VALVE A FROM WIDE OPEN POSITION

*INVENTOR.*
DONALD P. ECKMAN
BY Arthur H. Swanson
ATTORNEY

March 10, 1953 D. P. ECKMAN 2,630,824
CONTROL APPARATUS
Filed Nov. 15, 1947 2 SHEETS—SHEET 2

*INVENTOR.*
DONALD P. ECKMAN
BY
*Arthur H. Swanson*
ATTORNEY

Patented Mar. 10, 1953

2,630,824

UNITED STATES PATENT OFFICE 2,630,824

CONTROL APPARATUS

Donald P. Eckman, Ithaca, N. Y., assignor, by mesne assignments, to Minneapolis-Honeywell Regulator Company, Minneapolis, Minn., a corporation of Delaware Application November 15, 1947, Serial No. 786,246

7 Claims. (Cl. 137—492)

The general object of the present invention is to provide improvements in air controllers of the type known as proportional-speed floating controllers. Proportional-speed floating controllers are adapted for a wide variety of uses and are especially well adapted for use in controlling a flow or pressure under conditions in which the response of the controlled variable to an adjustment of the final control element, is characterized by a substantial, but not overly large lag.

The operation of such controllers are characterized by the movement of the final control element, usually a valve, at a rate dependent upon the magnitude of deviation from the control point, of the controlled variable. When such deviation occurs, the valve begins to close, or open, at a constant rate which is greater when the deviation is large than when the deviation is small, and when thereafter the magnitude of the deviation begins to diminish, the rate of valve adjustment is automatically diminished, and when the controlled variable attains its control point valve, the adjustment of the valve is interrupted. The normal position of the valve or other final control element thus depends upon, and floats with the load of the controlled process. In operation, such a controller recognizes not only the elapsed time of the deviation, but also the magnitude of the deviation.

The primary object of the present invention is to provide an improved air controller of the above mentioned type including a bleed nozzle and cooperative throttling or flapper valve, combined with simple and effective pneumatic means to adjust the final control element in the characteristic manner mentioned above when the controlled variable deviates from its normal value. A more specific object of the invention is to provide simple and effective means by which a derivative of the nozzle pressure, differing from the latter in a manner and to an extent depending upon a positive follow-up action of the controller, is amplified in a pilot or booster valve to thereby produce an output pressure through which the position of the final control element of the system is subjected to continuous adjustment during the deviation period.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
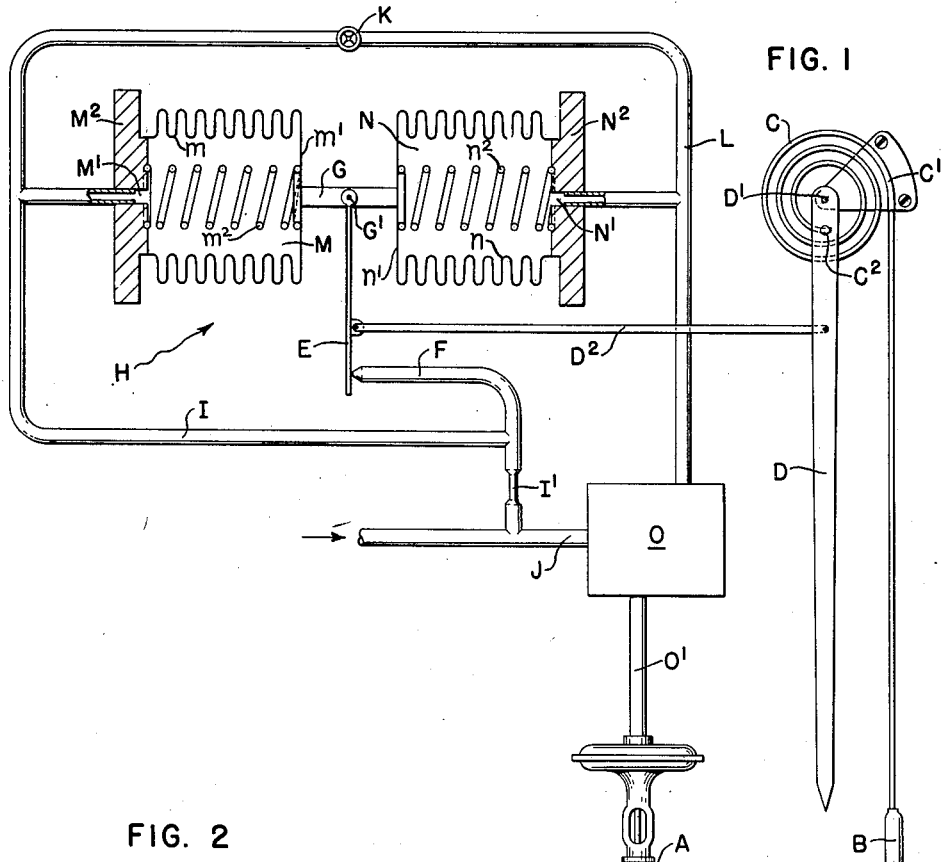
Fig. 1 is a diagrammatic illustration of a preferred embodiment of the present invention.

In Fig. 1, I have illustrated a preferred embodiment of the present invention, shown, by way of example, as used in regulating a fuel supply valve A in response to the variations in temperature to which the bulb B of a fluid pressure thermometer is subjected as a result of the combustion of the fuel supplied by the valve A. As shown in Fig. 1, the thermometer bulb pressure is transmitted to a Bourdon tube C in the form of a spiral having its outer end anchored at C'. The inner end of the spiral is connected at $C^2$ to a deflecting element D. The latter is pivoted at D' and may be the pen arm of a recording instrument provided with a chart and scale, not shown, with which the element D cooperates to record and indicate the value of temperature to which the bulb B is subjected. The deflecting element D is connected by a link $D^2$ to a valve E of the flapper type adapted for adjustment toward and away from the orifice end of a cooperating bleed nozzle F to vary the nozzle pressure. As diagramatically shown, the valve E is connected to, and suspended from a pin G' carried by a reciprocating element G forming a movable element of an air control mechanism H, of which the valve E and nozzle F form parts.

On a decrease or increase in the temperature of the bulb B, the Bourdon tube C gives a counter-clockwise or clockwise adjustment, respectively, to the deflecting element D and thus moves the valve E toward and away from the orifice end of the nozzle F. The nozzle F is connected to an air pipe I, receiving air through a restriction I' from a supply pipe J. The latter supplies air for use in the operation of the controller H at a substantially constant pressure which may well be seventeen pounds per square inch. The pipe I is connected by an adjustable throttling valve K to a second pipe L. As the valve E is moved between a position in which it substantially closes the bleed orifice at the adjacent end of the nozzle F, and a position in which the valve has no significant throttling effect on the flow through the nozzle F, the pressure in the pipe I varies from a maximum which is but little below the pressure in the pipe J, to a minimum which is little above zero.

The variable air pressure in the pipe I is transmitted to an expansible pressure chamber M through an inlet port M' in the stationary end wall $M^2$ of the chamber M. The wall of the chamber M also comprises a corrugated tubular bellows element $m$ having one end attached to the stationary end wall member $M^2$ and having its opposite end closed by a movable end wall $m'$ to which one end of the previously mentioned cross-bar G is attached. The second end of the bar G is connected to the movable end wall $n'$ of a pressure chamber N comprising a tubular bellows element $n$ having one end closed by the end wall $n'$ and having its other end connected to the stationary end wall $N^2$ of the chamber N. The pressure in the pipe L is transmitted to the chamber N through an inlet N'. Structurally, the chamber N is a counterpart of the chamber M, but the two chambers are reversed, relative to one another, so that the movable end walls $m'$ and $n'$ are juxtaposed and may be rigidly connected by the crossbar G.

The bellows elements M and N are advantageously made of thin flexible metal and have natural resiliency, so that the walls $m'$ and $n'$ are biased to normal positions by their own resiliency. Preferably and as shown, however, the biasing force due to the resiliency of the bellows elements M and N, is supplemented by the action of springs $m^2$ and $n^2$. The spring $m^2$ acts as a compression spring between the bellows end walls $m'$ and $M^2$, and the spring $n^2$ acts as a compression spring between the bellows end walls $n'$ and $N^2$.

The pressure in the pipe L is transmitted to the control inlet of a so-called pilot valve O, which is connected to the air supply pipe J and operates as an amplifying relay to utilize air received from the pipe J to maintain an output pressure in the output pipe O' of the relay valve which is in predetermined proportion to the pressure in the pipe I. The pipe O' transmits said output pressure to the pressure chamber of the regulator valve A. The relay or pilot valve O may be of any usual or suitable type operative to rapidly increase and decrease the pressure in the output pipe O', in accordance with the increases and decreases in the pressure transmitted to the pipe O' through the pipe L. For example, the valve O may be of the type and form of the pilot valve disclosed in the Moore Patent 2,303,891 of December 1, 1942.

In the normal contemplated operation of the apparatus shown in Fig. 1, the latter will be in a condition of balance during periods in which the temperature of the thermometer bulb B is constant at its predetermined normal value. In any such balanced condition of the apparatus, the pressures in the pipes I and L and in the chambers M and N are all equal, and have some value within the range of variation of air pressure in the nozzle F. The apparatus may well be so calibrated that with the normal or average process load, the air pressure in I, L, M and N is eight pounds per square inch.

When as a result of a process load increase or other cause, the temperature of the thermometer bulb B decreases, the spiral Bourdon C gives a counter-clockwise adjustment to the deflecting element D. This moves the valve E closer to the nozzle F and immediately increases the pressure in the nozzle, the pipe I and chamber M, and thus effects a negative follow-up movement of the cross-bar G to the right. That movement gives an opening adjustment to the valve E and thereby tends to decrease the pressure in the nozzle F, pipe I and chamber M. However, leakage through the throttling valve K from the pipe I to the pipe L and valve N begins as soon as the pressure in the pipe I increases. That leakage increases the pressure in the chamber N and expands the latter and thereby gives the cross-bar G a positive follow-up movement to the left, again increasing the pressure in the chamber M. Moreover, such further increase in the pressure in the chamber M is attended by a corresponding increase in the pressure in the chamber N. The last mentioned pressure continues to increase due to leakage through the valve K into the pipe L so long as the pressure in the chamber M exceeds the pressure in the chamber N, though the pressure increase in the chamber N lags the pressure increase in the chamber M. In consequence, the relay output pressure transmitted through the pipe O' to the regulator A, gives the latter a continuous opening adjustment which is not terminated until the temperature of the thermometer bulb B returns to its normal value, or until the flapper valve E is fully closed.

Operations which are the converse of those described occur when the thermometer bulb temperature rises above normal. When this occurs, the counter-clockwise adjustment of the element D moves the valve E further away from the nozzle F and thus makes the pressure in the pipe I lower than the pressure in the pipe L. The resultant reduction in the pressure in the chamber M produces a negative follow-up adjustment of the valve E in the closing direction. The negative follow-up adjustment of the valve E is soon neutralized by the reverse or positive follow-up adjustment which results from the leakage of air past the valve K from the pipe L into the pipe I. That leakage results in a decrease in the pressure in the chamber N, and continues until the bulb temperature returns to normal or until the valve E attains its wide open position. As will be apparent, the greater the deviation of the controlled variable from its normal value in either direction, the greater will be the difference between the pressures in the chambers M and N, and hence the more rapid will be the rate at which the pressure transmitted to the regulator A is varied.

Figure 2:
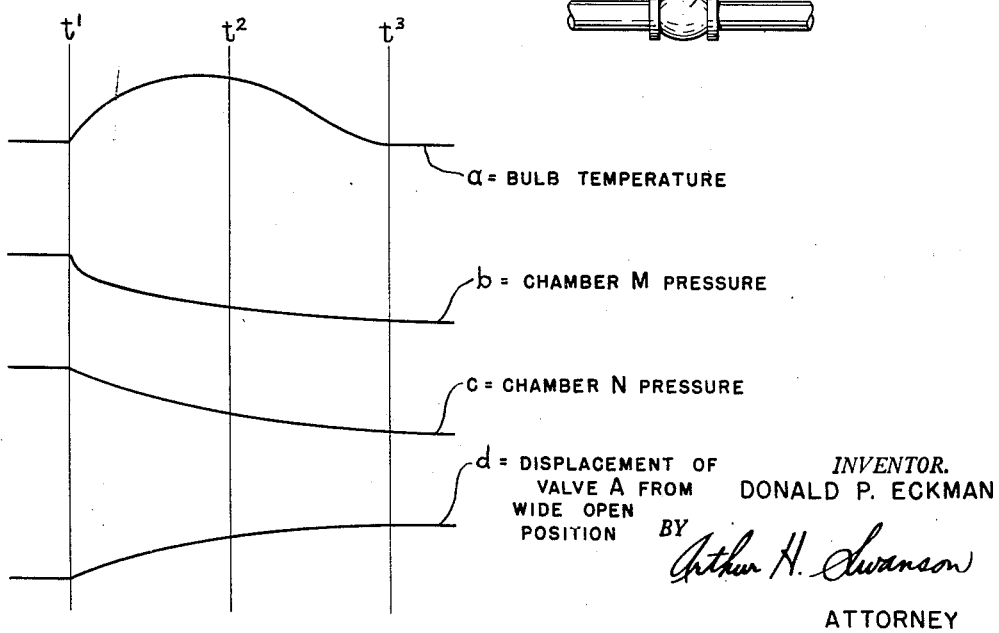
Fig. 2 is a diagram illustrating the effect on the controller nozzle and output pressures and on the position of the final control element of a change in the controlled variable.

The manner in which a decrease in the need for fuel supplied by the regulator valve A effects the operation in the apparatus shown in Fig. 1, is illustrated by the curves shown in Fig. 2. In that figure, the curves $a$, $b$, $c$ and $d$, respectively indicate the temperature of the thermometer bulb, the pressure in the chamber M, the pressure in the chamber N, and the position of the regulator valve A during a time period in which the thermometer bulb temperature differs from its normal or control point value. The duration of said time period is represented in Fig. 2 by the horizontal distance between the vertical time lines $t1$ and $t3$. Vertical displacements from one another of points along the curve $a$ represent thermometer bulb temperature differences. Vertical displacements from one another of points along each of the curves $b$ and $c$ represent differences in the air pressure, and vertical displacements from one another of points along the curve *d* represent differences in the extent to which the regulator valve is displaced from its wide open position.

It is assumed that the thermometer bulb temperature progressively increases below its normal value during the time interval represented by the horizontal distance between the line *t1* and the time line *t2*, which is intermediate lines *t1* and *t3*, and that said temperature returns to its normal value during the interval represented by the horizontal distance between the lines *t2* and *t3*. The normal or control point value of the thermometer temperature is represented by the horizontal portions of the curve *a* at the left of the line *t1*, and at the right of the line *t3*. As the curve *d* plainly indicates, the change in the thermometer bulb temperature shown by the curve *a* is assumed to have resulted from a decrease in the process load or heat requirement which was maintained during the period.

As the curve *a* indicates, the initial increase in the thermometer bulb temperature is assumed to be relatively rapid. In consequence, the initial drop in the chamber M pressure is abrupt, as is indicated by the portion of the curve *b* at the right and immediately adjacent to the line *t1*. Thereafter, the pressure in the chamber M decreases gradually until the time instant indicated by the line *t3*. The portions of the curves *a* and *b* between the time lines *t2* and *t3* indicate a normal progressive decrease in the thermometer bulb temperature, and in the chamber M pressure, as the thermometer bulb temperature returns to normal.

As the portion of the curve *c* adjacent and to the right of the line *t1* shows, the initial decrease in the chamber N is much less abrupt than the initial increase of the pressure in the chamber M, and the rate of change of the chamber N pressure is higher than that of the chamber M pressure as the thermometer temperature closely approaches its normal value. During the intermediate portion of the period indicated by distance between the lines *t1* and *t3*, the difference between the pressures in the two chambers is approximately constant.

The changes in the position of the valve *a*, shown by the curve *d*, are substantially proportional to the changes in the pressure in the chamber N represented by the curve *c*. In consequence, as the curve *d* indicates, the control valve is being continuously adjusted in the closing direction during the period represented by the distance between the time lines *t1* and *t3*, but the curve becomes asymptotic as do each of the other curves, as the thermometer bulb temperature returns closely to its normal value.

Figure 3:
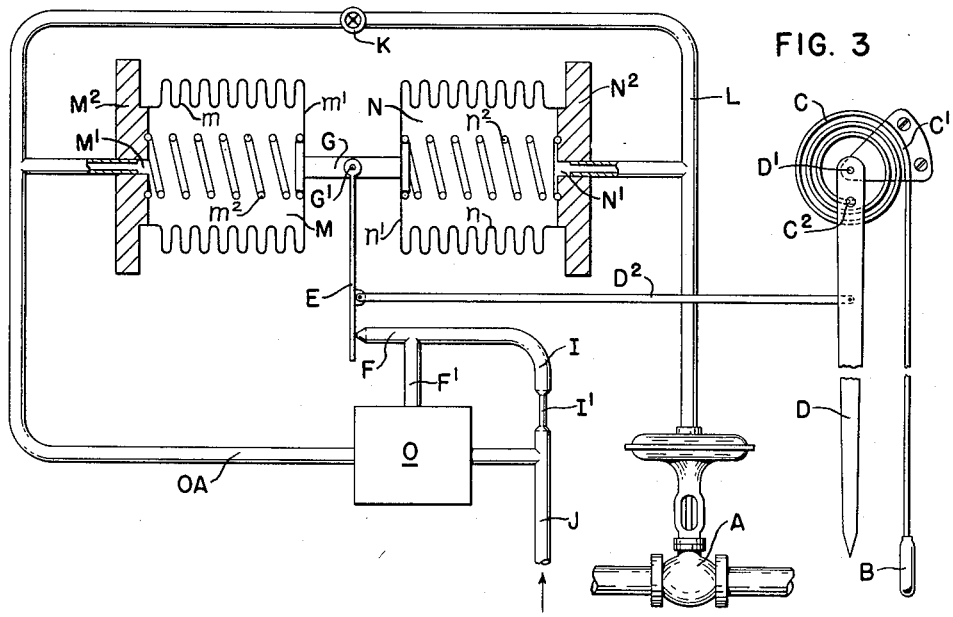
Figs. 3 and 4 are views generally similar in character to Fig. 1, and each illustrating a different modification of the apparatus shown in Fig. 1.

The arrangement shown in Fig. 3 differs from that shown in Fig. 1 essentially in that the output pressure of the relay valve O is transmitted through a pipe OA to the chamber M and to the throttling valve K, and in that the pipe L is directly connected to the pressure chamber of the regulator A and not to the pilot valve O, and in that the nozzle pressure is transmitted by the pipe IA to the control inlet of the pilot valve O. The general operation of the apparatus shown in Fig. 3 is the same as that of the apparatus shown in Fig. 1. In particular, the positive follow-up or feed-back action of the chamber N operates in Fig. 3, as in Fig. 1, to maintain a corrective adjustment, or change in position, of the regulator A during each period in which the thermometer bulb temperature is not at its normal value. With the arrangement shown in Fig. 3, the air flowing to and away from the regulator A, as well as the air passing into and out of the chamber N, passes through the valve K and the cross-sectional area of the path of flow through that valve is thus relatively larger in the arrangement shown in Fig. 3 than in the arrangement shown in Fig. 1.

Figure 4:
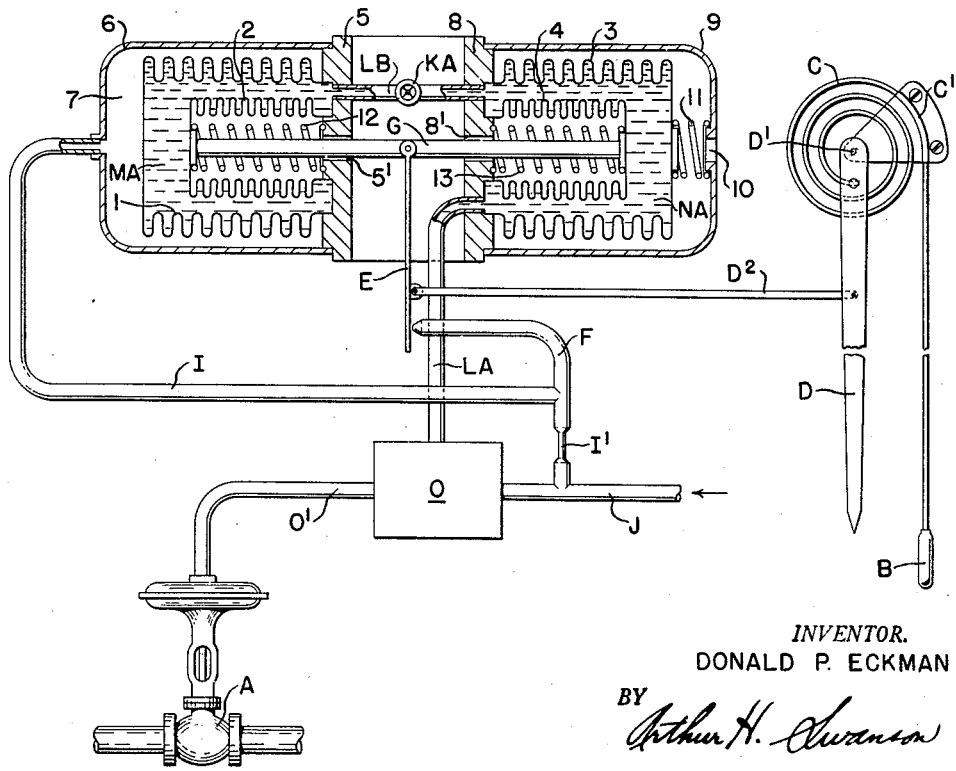

In Fig. 4, I have illustrated an embodiment of the invention in which the pressure chambers in which pressures vary as do the air pressures in the chambers M and N of Figs. 1 and 3, are liquid filled inter-bellows chambers MA and NA. In the arrangement shown in Fig. 4, use is made of a bellows assembly including two large aligned bellows elements 1 and 3, and two small bellows elements 2 and 4, which are respectively surrounded by the large bellows elements 1 and 3. The four bellows assembly shown in Fig. 4 is structurally like the four bellows assembly included in a well-known and widely used proportional air controller with reset, which is of the type and form disclosed in the Moore patent, 2,125,081 of July 26, 1938.

Each of the bellows elements 1, 2, 3 and 4 is individually similar in form to the bellows element *m* of Fig. 1, in that it comprises a corrugated tubular metallic body having one end closed and having its other end connected to a stationary wall or support. The bellows chamber MA is the inter-bellows chamber or space between the large bellows element 1 and the smaller coaxial bellows element 2. Similarly, the bellows chamber NA is the inter-bellows space between the large bellows element 3 and the smaller coaxial bellows element 4. The otherwise open ends of the bellows elements 1 and 2 are each connected to a stationary end wall or supporting member 5 which is formed with a central aperture 5' through which the space within the smaller bellows is in communication with the atmosphere. A cup shaped casing element 6 surrounds the element 1 and has its otherwise open end connected to the support 5 and unites with the latter and with the bellows 1 to form an air chamber 7 which is connected by the pipe I to the bleed nozzle F as in Fig. 1.

The large and small bellows elements 3 and 4 are attached to the stationary end member or support 8 which faces, and is spaced away from the support 5. The unit or section comprising the bellows elements 3 and 4 and support 8 may be a reversely faced counterpart of the unit or section comprising the bellows elements 1 and 2 and support 5. As shown, the bellows element 3 is surrounded and protected by a cup shaped member 9 having its otherwise open end secured to the support 8. The cup shaped member 9 is formed, however, with a port or ports 10 sufficiently large to make the pressure within the member substantially that of the atmosphere at all times. The member 9 serves as an abutment member for a helical compression spring 11 which acts between the movable end of the outer bellows element 3 and the end of the casing 9 remote from the support 8. The movable end of the inner bellows 4 is connected to the corresponding end of the cross-bar G which extends through the central apertures 5' and 8' in the supporting members 5 and 8. A helical compression spring 12 acts between the movable end of the inter-bellows 2 and the stationary support 5, and a similar helical compression spring 13 acts between the movable end of the bellows element 4 and stationary support 8. The springs 12 and 13 cooperate with the natural resiliency of the bellows elements 2 and 4 to maintain the normal length of those bellows elements and the normal position of the cross-bar G, regardless of the pressure which may then exist in the nozzle F and chamber 7. A pipe LA connects the chamber NA to the control inlet of the pilot or relay valve O. The chambers MA and NA are connected by a conduit LB which includes a throttling valve KA, usually in the form of a needle valve.

As previously indicated, the general operation of the apparatus shown in Fig. 4 is similar to that of the apparatus shown in Fig. 1. Changes in the nozzle pressure F are immediately transmitted directly to the chamber 7 and indirectly through the movable element 1 to the interbellows chamber space MA. The pressure change thus produced in the chamber 7 operates through the bellows element 1 and the liquid in the chamber MA to give an immediate negative follow-up adjustment to the cross-bar G and thereby to the flapper valve E suspended from the cross-bar as in Fig. 1. Those cross-bar and flapper valve adjustments are soon neutralized and reversed by positive follow-up adjustments resulting from the leakage of liquid through the valve KA. That leakage causes each pressure increase in the chamber MA to produce a corresponding but retarded increase in the pressure in the chamber NA. Similarly on each decrease in the pressure in the chamber MA, the high pressure in the chamber NA causes liquid to leak from the chamber NA into the chamber MA and thereby effect a corresponding but retarded decrease in the pressure in the chamber NA. Such a retarded increase or decrease in the pressure in the chamber NA results in a positive follow-up adjustment of the flapper valve, respectively moving the valve toward or away from the nozzle F and thus respectively increasing or decreasing the pressure in the air chamber 7.

As diagrammatically shown by way of example in Fig. 4, the air controller illustrated therein is included in a control system in which the pressure corresponding to the temperature of the thermometer bulb B operates through a Bourdon tube C to adjust a flapper valve E as in Fig. 1. The pressure in the chamber NA of Fig. 4 is transmitted by a pipe LA to the control inlet of a pilot valve O receiving air under pressure from a supply pipe J, which also passes air to the nozzle F and pipe I through a restriction I'. The output pressure of the pilot valve or pneumatic relay O is transmitted through a pipe O' to a regulator valve A operatively related to the thermometer bulb B in Fig. 4 as the regulator A and valve B are related in Fig. 1.

The invention in each of its forms illustrated in Figs. 1, 2 and 3, is characterized by the mechanical simplicity and effectiveness of the pneumatic provisions by which an air controller is adapted for use as a practical and reliable proportional-speed floating controller.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. An air controller of the proportional-speed floating type comprising in combination first and second expansible pressure chambers each tending to expand on a pressure increase therein, a mechanical connection between said chambers moved by the expansion of either chamber in a direction in which it effects a contraction of the other chamber, mechanism effecting an initial variation in the pressure in said first chamber on a departure in the value of a controlled variable from a predetermined normal value thereof, said mechanism comprising valve means and means responsive to variations in the value of said variable for effecting corresponding adjustments of said valve means and thereby effecting an initial expansion or contraction of said first chamber when said variable departs from its normal value, valve operating means actuated by said connecting means in selective accordance with the movement of said mechanical connection and arranged to operate on said initial expansion or contraction of said first chamber to effect a negative follow-up adjustment of said valve means tending to neutralize said initial pressure change in the first chamber, conduit means providing a restricted path of flow between said chambers whereby said initial pressure change in said first chamber produces a retarded pressure change in the same direction in said second chamber and the latter thereupon moves said connecting means to initiate a progressive positive follow-up adjustment of said valve means augmenting the initial pressure change in the first chamber and normally continuing until the controlled variable returns to its normal value, and means to utilize the pressure and the retarded changes therein in said second chamber to produce a proportional-speed floating type control action in addition to the follow-up adjustment of said valve means.

2. An air controller of the proportional-speed floating type comprising in combination, first and second pressure chambers each having a movable wall connected to a movable wall of the other and so arranged that a pressure increase or decrease in the first chamber operates through the connected movable walls to respectively produce a corresponding pressure increase or decrease in the second chamber, mechanism for effecting an initial corrective variation in the pressure in said first chamber on a deviation of a controlled variable from a predetermined normal value thereof comprising valve means and means responsive to variations in the value of said controlled variable for adjusting said valve means, means through which the movement of said movable walls produced by the initial variation in the pressure in the first chamber produces a negative follow-up adjustment of said valve means, conduit means providing a restricted path of flow between said chambers whereby the initial pressure variation in the first chamber produces a retarded pressure change in the same direction in the second chamber and thereby causes said second chamber to effect a positive follow-up adjustment of said valve means which normally continues until the controlled variable returns to its normal value, and means to utilize the pressure and the retarded changes therein in said second chamber to produce a proportional-speed floating type control action in addition to the follow-up adjustment of said valve means.

3. An air controller as specified in claim 2, including means for transmitting the pressure in said second chamber to a fluid pressure actuated regulator.

4. An air controller as specified in claim 2, in which said first and second pressure chambers normally contain air under pressure, and in which said valve means operates when adjusted to pass air under pressure into said first chamber or to exhaust air from said chamber and thus respectively increases or decreases the pressure in said first chamber.

5. An air controller as specified in claim 2, in which said first and second pressure chambers and said conduit are included in a closed liquid filled system, and which include an expansible air chamber having a movable wall arranged to subject said first chamber to a force tending to contract the latter which is respectively increased and decreased as the air pressure in said air chamber is increased and decreased, and in which said valve means operates to effect an initial increase or decrease in the pressure in said first chamber by respectively passing air under pressure into said air chamber or by permitting air to escape from said air chamber, and including means for transmitting an air pressure proportional to the pressure in said air chamber to a fluid pressure regulator.

6. A control system including an air controller of the proportional-speed floating type comprising in combination, first and second pressure chambers each having a movable wall connected to a movable wall of the other and so arranged that a pressure increase or decrease in the first chamber operates through the connected movable walls to respectively produce a corresponding pressure increase or decrease respectively, in the second chamber, mechanism for effecting an initial corrective variation in the pressure in said first chamber on a deviation of a controlled variable from a predetermined normal value thereof comprising valve means and means responsive to variations in the value of said controlled variable for adjusting said valve means, means through which the movement of said movable walls produced by the initial variation in the pressure in the first chamber produces a negative follow-up adjustment of said valve means, and conduit means providing a restricted path of flow between said chambers whereby the initial pressure variation in the first chamber produces a retarded pressure change in the same direction in the second chamber and thereby causes said second chamber to effect a positive follow-up adjustment of said valve means which normally continues until the controlled variable returns to its normal value, a fluid pressure regulator controlling said controlled variable and means subjecting said regulator to a control pressure proportional to the pressure in said second chamber.

7. A control system as specified in claim 6, in which the means for subjecting said regulator to a control pressure comprises a pneumatic relay valve having an input connected to said second chamber and an output connected to said regulator.

DONALD P. ECKMAN.

REFERENCES CITED

The following references are of record in the file of this patent:

UNITED STATES PATENTS

| Number | Name | Date |
|---|---|---|
| 2,360,889 | Philbrick | Oct. 24, 1944 |
| 2,369,571 | Jones | Feb. 13, 1945 |
| 2,427,235 | Smoot | Sept. 9, 1947 |
| 2,429,695 | McBrath | Oct. 28, 1947 |
| 2,476,104 | Mason | July 12, 1949 |
| 2,507,606 | McLeod | May 16, 1950 |
| 2,512,561 | Ziegler | June 20, 1950 |
| 2,529,875 | Howard | Nov. 14, 1950 |